United States Patent [19]

Beck et al.

[11] 4,234,891
[45] Nov. 18, 1980

[54] OPTICAL ILLUMINATION AND DISTORTION COMPENSATOR

[75] Inventors: James C. Beck, La Canada; Harrie W. Nielsen, Pasadena, both of Calif.

[73] Assignee: The Singer Company, Binghamton, N.Y.

[21] Appl. No.: 62,446

[22] Filed: Jul. 30, 1979

[51] Int. Cl.³ .................... H04N 7/18; G09C 9/00; G02B 17/00; G02B 9/08
[52] U.S. Cl. ................................ 358/104; 358/238; 350/55; 35/12 N
[58] Field of Search ............... 358/104, 237, 238, 239, 358/250; 35/12 M, 10.21, 10.22, 10.23; 350/55, 123, 174

[56] References Cited

U.S. PATENT DOCUMENTS

| | | | |
|---|---|---|---|
| 3,784,742 | 1/1974 | Burmham et al. | 358/104 |
| 3,785,715 | 1/1974 | Mecklenborg | 358/104 |
| 4,112,462 | 9/1978 | Mecklenborg | 358/104 |

Primary Examiner—Robert L. Griffin
Assistant Examiner—Edward L. Coles
Attorney, Agent, or Firm—Douglas M. Clarkson; Jeff Rothenberg

[57] ABSTRACT

This disclosure describes a method and apparatus for a visual display system in a vehicle simulator to compensate for distortion and to maximize illumination in a projected image substantially at the same time. Where a spherical mirror is interposed between a curved rear-projection screen and a viewing position, certain distortions are developed which detract from realism. Such distortions are compensated for by reflecting the image off a curve folding mirror positioned so that its major axis is substantially perpendicular to the major axis of the curved rear-projection screen. In accordance with the invention, when such compensation is achieved, the illumination of the projected image will be at substantially its brightest.

17 Claims, 3 Drawing Figures

OPTICAL ILLUMINATION AND DISTORTION COMPENSATOR

The Government has rights in this invention pursuant to contract F33657-77-C-0176 awarded by the Department of the Air Force.

The present invention relates, generally, to vehicle simulators and, more particularly, to a method and apparatus for a visual display system for use in a vehicle simulator to compensate for various types of distortions.

BACKGROUND OF THE INVENTION

The use of visual display systems in simulators for training purposes, particularly in ground based aircraft trainers, has already shown a constant, steady increase. Today's rapidly increasing technology, along with the increasing cost of operating aircraft, taken together provides the need and creates a demand for simulators for such training purposes.

A primary area of concern in this demand for simulators is that dealing with visual display systems. It is a constant objective in the simulator manufacturing field to provide as much realism for a trainee in the simulator as he would expect to encounter in an actual aircraft. This is particularly true in simulators of military vehicles where the trainee must locate visually targets over a wide field of view. It is desirable also to have an infinity image display to make the scene viewed even more realistic.

Vehicle simulators are used to simulate the actual motion of a vehicle in order that one or more trainees may obtain experience without the use of an actual vehicle. The present invention is applicable to aircraft flight simulators and also is applicable equally to simulators for other vehicles and to apparatus generally for simulating a real life situation.

It was a significant improvement in flight simulation and similar display system when collimation of the displayed image was achieved, that is, by making all image points appear to be at infinity. The problem of providing collimation is complicated because it introduces certain distortions. Optical systems are known which will provide collimated light for a single trainee, but to compensate for the distortions and to provide maximum illumination is still a troublesome problem.

In such known optical systems, distortion may be minimized and illumination may be improved, but in such systems, these two defects have not been able to be corrected or compensated for at the same time without the use of additional components. In U.S. Pat No. 3,784,742 to Burnham et al, several different arrangements are reviewed for correcting distortion and for improving illumination, none of which do it at the same time or do it the same way.

None of the efforts in the prior art to solve the problem of compensating for (or correcting) distortions or to improve the brightness of the projected image, even recognize that these can be accomplished at the same time without the use of additional components. Additional components to do these separately add materially to the overall cost of the system. With a system constructed in accordance with the present invention, a better light transmission is achieved because there are fewer components in which light can be lost.

SUMMARY OF THE INVENTION

An object of the present invention is to provide a method and apparatus for certain visual displays which overcome limitations of the known systems described above.

It is also an object of the invention to provide an optical system to compensate for distortions and to improve the illumination at the same time without requiring any special optical components, some of which could be of difficult manufacturing requirements, expense or complication.

A principal object of the invention is to provide improved method and apparatus for compensating substantially simultaneously for distortion and for misalignment between the projection and the viewing axes in order to improve illumination.

A visual system arranged in accordance with the principals of the present invention includes a projector, which preferably is a "light valve" projector, and a curved folding mirror with a major axis. From the curved folding mirror, the image is reflected onto a curved rear-projection screen whose major axis is positioned substantially perpendicular to the major axis of the curved folding mirror. This constitutes the "projection system". The "viewing system" is composed of the same curved rear-projection screen and a decentered spherical mirror.

By the term "decentered" is meant the center of curvature of the mirror does not fall on the viewing axis. The "viewing axis" is the line from the eyepoint reflected from the spherical mirror to the center of the curved screen.

The spherical mirror can be arranged with its center of curvature removed from the viewing axis and still satisfy collimation requirements in the system. However, it does introduce a distortion such that the lateral edges of the field of view at the screen appear to droop downwardly.

The term "viewing position" is that position where the trainee sees a collimated image, and this collimated, compensated image is formed on the curved screen. The spherical mirror is used as a collimator so that the image appears at infinity to the trainee.

In an arrangement in accordance with the invention, the emphasis is on the substantially simultaneous nature of compensation for the distortion and improving the illumination. The distortion compensation involves positioning the curved folding mirror adjacent the curved screen with a particular orientation relative to the screen. This orientation is such that one end of the curved folding mirror is closer to the screen than is the other, in order to present a maximum reflective surface to the projected format, while maintaining its substantially perpendicular relationship as viewed from the viewing position. In general, the curved folding mirror is fairly close to the screen.

Other objects, aspects and advantages of the invention will be pointed out in part, and will be apparent in part from, the following detailed description, taken along with the accompanying drawings.

DESCRIPTION OF THE PREFERRED EMBODIMENT

Figure 1:
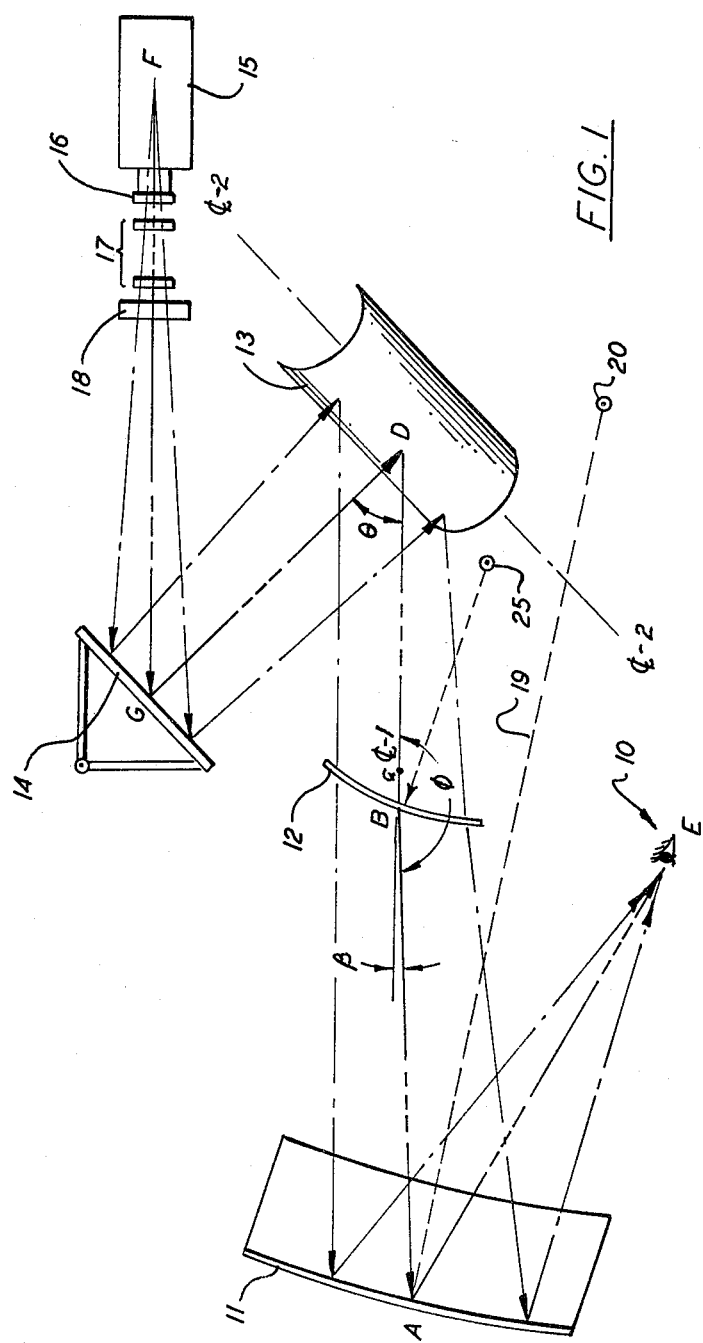
FIG. 1 is a side view in elevation, partly in perspective, of certain optical display components for the purpose of aiding the explanation of the principals of the invention.

Referring now to FIG. 1 of the drawings, the numeral 10 identifies a position in which a trainee with his eyepoint at E in a simulator would view a scene, the center of which is indicated at point A along the line AE. The scene being viewed is a collimated visual image for viewing by at least one trainee, and the center of this scene, point A, is reflected from a spherical mirror 11. The spherical mirror 11 is arranged and positioned so that its reflective surface is on the concave part of its contour.

Actually, the point A is a reflection of a point B, which is the center of a scene formed on a toroidal rear-projection screen 12. The spherical mirror 11 collimates the scene on the screen 12.

As the following description unfolds, it will become obvious how the invention in its present embodiment is able to provide to a trainee in a simulator an image of an area of interest which image is substantially undistorted and undiminished in its illumination, i.e., with maximum brightness.

First, a decision is made as to the area to be displayed during training, and a flight is made in an actual aircraft over that area with a motion picture camera attached to the aircraft pointed at the area of interest. The processed film then is used as an image source for the invention.

The trainee sits in a simulated aircraft cockpit, which is an exact duplicate of that of the real aircraft, and in this position, he must "fly" in a simulated path, which approximates the actual path followed by the aircraft from which the motion picture was taken. Arranged around the windows of his simulated cockpit is the visual display, which is projected realistically by television monitors.

The remainder of the system to be described herein, which may be at a remote location to the cockpit position, operates upon the film image to give it the proper perspective from the trainee's viewpoint in the simulator and to position it properly in his field of view. This is done by viewing the image as it is projected by a television camera using well known optical and electronic techniques. A visual display arrangement in accordance with the present invention permits an adjustment to the display which has not been attainable heretofore.

Referring back again to FIG. 1 of the drawings, the numeral 12 identifies a rear-projection screen which is positioned substantially at the focal point of a concave spherical mirror 11, at about ½ of its radius of curvature. The screen 12 is toroidal in configuration and is positioned with its major axis CL-1 substantially horizontal. As viewed in FIG. 1 of the drawings, the major axis CL-1 is perpendicular to the page. Also the screen 12 is positioned so that it is concave in the same direction as the spherical mirror 11.

A folding mirror 13 is cylindrical in configuration, with its major axis CL-2 approximately vertical (relative to the major axis of the toroidal screen 12 and as viewed along the line BD), and is positioned to reflect an image from a flat folding mirror 14, which image originates in a light valve projector 15. The projector 15 preferably is a television image projector.

One of the reasons that a flat folding mirror 14 must be positioned intermediate the projector 15 and the cylindrical folding mirror 13 is that the light valve projector, which is used so commonly today in simulator visual systems, cannot be tilted more than approximately 30° from the horizontal. At the image output side of the projector 15 is the usual projection lens 16.

In accordance with one aspect of the present invention, it is desirable and advisable to have an anamorphic lens system 17, the purpose of which will be explained in greater detail presently. After this anamorphic lens system 17, there is a collimator 18, also to be explained in greater detail presently.

With no distortion compensation (or correction), the output of the "light valve" projector 15 is a rectangular format with three to four aspect ratio so that it is really one inch wide by three-quarters inch high. Such a format would appear distorted at the viewing position 10.

However, such distortions are compensated for, in accordance with the present invention, by the cylindrical mirror 13. The major axis CL-2 of the cylindrical mirror 13 is vertical, when compared with the horizontally positioned major axis CL-1 of the toroidal screen 12, and this axis of the cylindrical mirror 13 is tilted so that its reflective surface is more nearly perpendicular to the line GD from the flat, folding mirror 14. The particular degree of tilt would be dependent upon it being sufficient to reflect the format from the flat, folding mirror 14 onto the toroidal screen 12 and is a matter of design.

The distortion for which the present invention is so uniquely adapted to compensate is developed because the center line for the curvature of the spherical mirror 11 appears on the dashed line 19, whereas the viewing axis for this same spherical mirror 11 is the line EAB. The center of curvature for the spherical mirror 11 is on the line 19 as indicated by the reference numeral 20 and not on the line AE or on the line AB.

The center of curvature for the toroidal screen 12 appears below the line BD at a point 25. The "viewing system", therefore, is composed of the toroidal screen 12 and the decentered spherical mirror 11.

The use of the cylindrical folding mirror 13, therefore, introduces a distortion that compensates for distortions caused by the spherical mirror 11 and the toroidal screen 12. The spherical mirror 11, is used as a collimator, so that the image appears substantially at infinity for the trainee at the viewing position 10.

The "projection axis" is the line BDGF, whereas the "viewing axis" is the line EAB.

With the center of curvature 20 for the spherical mirror 11 being displaced and removed from the line AB a requirement for collimation and field of view in this system can be satisfied. However, also it introduces a distortion such that the lateral edges of the field of view at the screen 12 appear to droop downwardly.

Under usual circumstances, the illumination is maximized when the viewing axis AB is in alignment with the projection axis BD. Therefore, the nearer that these two axes are in alignment, the better the chances are of achieving maximum illumination.

Figure 2:
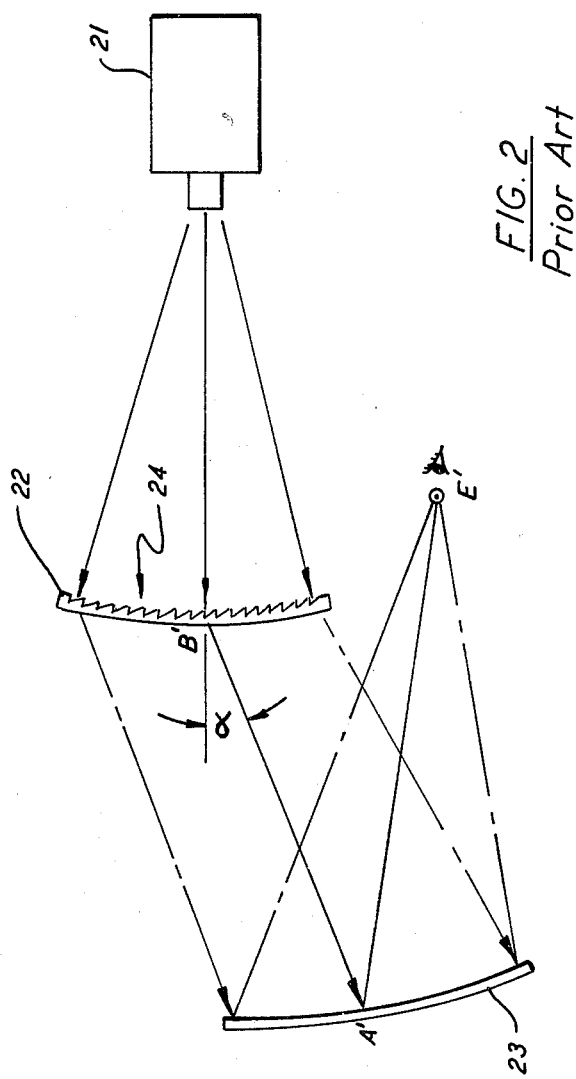
FIG. 2 is an illustration of the prior art.

Referring now to FIG. 2 of the drawings, a television camera 21 projects an image directly upon a rear projection screen 22 from which the image is reflected from a curved mirror 23 to the viewing position indicated by the letter E'. In accordance with the prior illustration therefore, E' is in proper position to view at A' the reflected point B' which is on the screen 22. If an undistorted image from the projector 21 is projected onto the screen 22, it must satisfy the distortion requirements of the viewing position E', and in so doing, a very large angle α is developed between the viewing system and the projection system.

Such a large angle α develops a non-uniform illumination of the system that is seen by the trainee at the position E'. This uneven and non-uniform illumination will develop in the scene as being darker at the bottom and getting brighter toward the top. This prior art compensates for the non-uniform illumination by introducing prisms 24 to redirect the light.

A further distinction of the prior art from the present invention is that the mirror 23 is a spheroid, or an ellipsoid of revolution, resembling a sphere. Now, by utilizing a spherical screen 22, the prior art system then requires that the television projector 21 must be substantially square with the screen 22 in order to minimize distortion. Nevertheless, the larger angle α still requires that some artificial means be employed to improve the illumination.

Contrasting this prior art arrangement with that of the present invention, a toroidal screen and a spherical mirror give a different distortion characteristic to the image produced, i.e., the two outside edges droop downwardly. The distortion that is compensated for by the present invention is that created by the geometrical relationship between the eyepoint E, in FIG. 1, the mirror 11 and the screen 12. The geometrical relationship between these elements introduces a distortion into this optical system which is substantially compensated for by the positioning of the cylindrical mirror 13 as described, without having to modify the projector 15 and without additional optical components.

In a majority of the instances, the cylindrical mirror 13 will be sufficient to compensate for all of the obvious and detectable distortions. However, in some instances, a further compensation may be indicated. In such an instance, an anamorphoser 17 would compensate for magnification. The anamorphoser 17, accordingly, permits adjustment in one dimension only, such as horizontal, and is used where the height of the image at the screen is correct.

In one actual construction in accordance with the arrangement of FIG. 1, the radius for the spherical mirror 11 is 162 inches, the radius for the screen 12 is 100 inches and the radius for the cylindrical mirror 13 is 200 inches. The line BD is 34 inches in length.

Figure 3:
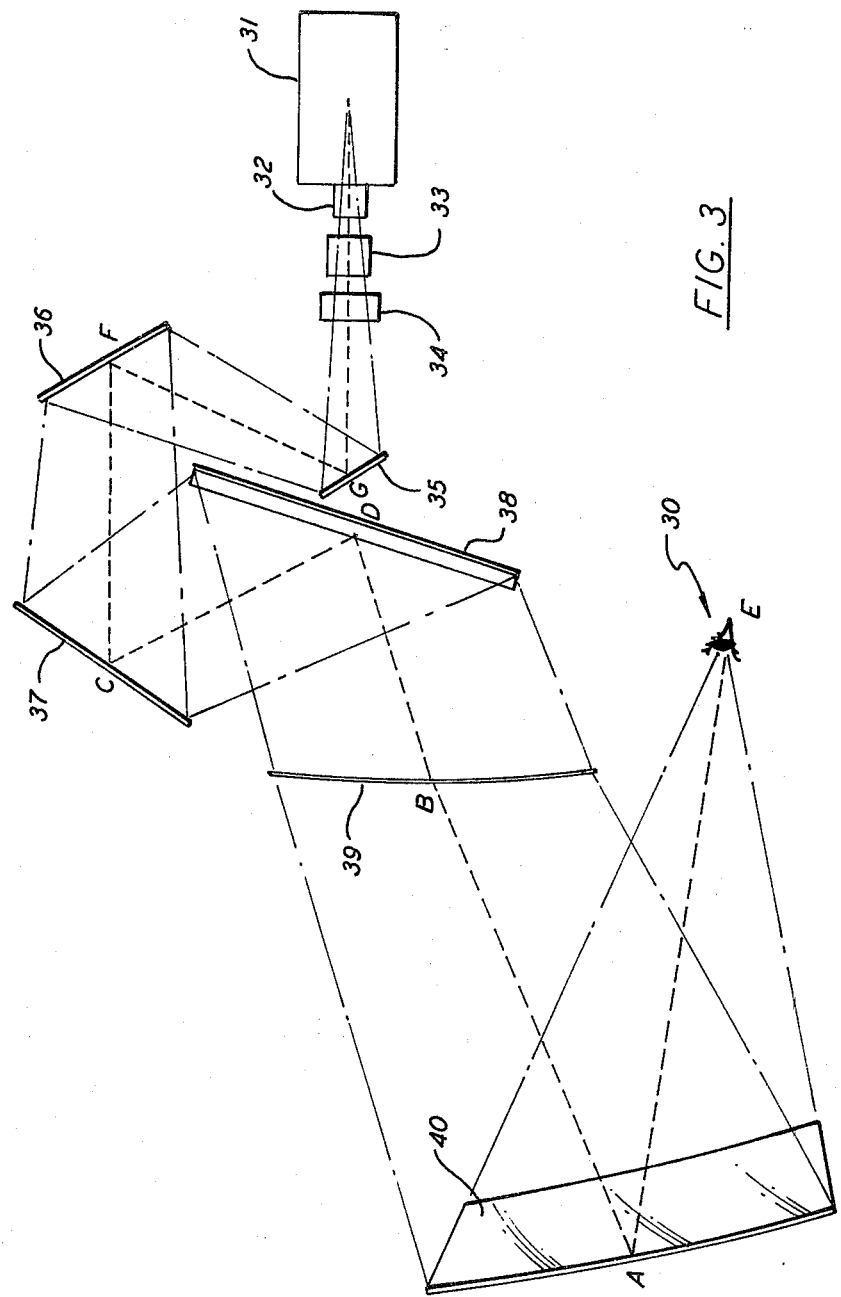
FIG. 3 is a view, like FIG. 1, of a presently preferred embodiment of the invention.

Referring now to FIG. 3 of the drawings the eyepoint E is identified also by the reference numeral 30. A standard television projector 31 is positioned to project images through its normal lens 32, through an anamorphic lens 33 and a collimator 34 onto a folding mirror 35, whose centerpoint is indicated by the letter G. From the mirror 35 the image is folded upwardly to another flat folding mirror 36, to a third flat folding mirror 37 before it is directed onto a cylindrical mirror surface 38.

From the cylindrical mirror 38 the image is focused onto a rear-projection, curved screen 39, which curvature, preferably is toroidal in configuration. Accordingly, the "projection axis" is the line BDCFG.

From the toroidal screen 39, the image is reflected from a spherical mirror 40 onto the viewing position at the eyepoint E, in order to form a collimated image. Accordingly, the viewing axis is the line EAB.

In another actual construction in accordance with the arrangement of FIG. 3, the radius for the spherical mirror 40 again is 162 inches, the radius for the screen 39 again is 100 inches and the radius for the cylindrical mirror 38 is 300 inches. The line BD is 44 inches in length.

While the essential characteristic of the screen and the folding mirror is that they are curved, the particular configuration selected is determined usually by economic considerations, some configurations being quite expensive to manufacture. The cylindrical configuration is most often the least expensive, but without the method of positioning of a toroidal screen and folding cylindrical mirror as taught by the present invention, the effectiveness of any selected configuration could not be realized.

In view of the above detailed description of the preferred form of the invention and in view of the above-mentioned modifications thereto, other modifications, variations, advantages and uses will occur to one skilled in the art. Accordingly, the description and modifications presented hereinabove are to be considered as illustrative only, the true spirit and scope of the invention being that defined by the claims appended hereto.

What is claimed is:

1. A method of compensating for the distortion developed in an optical display apparatus due to the imposition of a concave spherical mirror for viewing intermediate a viewing position and a curved rear-projection screen and for improving the illumination substantially simultaneously, comprising:

establishing a viewing position,
   arranging a concave spherical mirror for viewing from said viewing position by at least one trainee,
   positioning a curved rear-projection screen on the side of said concave spherical mirror so that the image on said screen is visible when reflected by said mirror toward said viewing position,
   locating a curved folding mirror adjacent said curved rear-projection screen so that an image is reflected from the curved folding mirror onto said screen,
   positioning the major axes of said curved folding mirror and said curved rear-projection screen in a predetermined relationship relative to each other, whereby distortion is reduced and illumination increased substantially simultaneously; and
   projecting an image for reflection from said curved folding mirror onto said curved rear-projection screen so that said image is viewed at said viewing position substantially undistorted and with substantially maximum illumination.

2. The method according to claim 1 including the step of positioning said concave spherical mirror so that its center of curvature is intermediate the viewing position and said curved rear-projection screen.

3. The method according to claim 1 including the step of forming said concave mirror with the contour of a sphere segment.

4. The method according to claim 1 wherein the major axis of said curved rear-projection screen and that of said curved folding mirror are positioned at substantially right angles to each other.

5. The method according to claim 1 including the step of projecting onto said curved rear-projection screen an anamorphically compensated image, so that the image viewed at said viewing position will be substantially undistorted.

6. Visual display apparatus to provide improved illumination and to compensate for distortion substantially simultaneously for the viewing of a projected scene, comprising:

a concave spherical mirror positioned to reflect a predetermined scene to a viewing position, a curved rear-projection screen positioned substantially at the focal point of said concave spherical mirror, a curved folding mirror positioned to reflect onto said curved rear projection screen a scene to be viewed, and means to project said predetermined scene for reflection from said curved folding mirror onto said curved rear projection screen, the major axes of said curved rear-projection screen and said curved folding mirror being in a predetermined relationship relative to each other, so that distortion in said scene viewed at said viewing position is compensated for at substantially the same time as illumination is obtained substantially at its brightest level.

7. The visual display apparatus as set forth in claim 6 wherein the contour of said concave mirror is substantially a spherical segment.

8. Visual display apparatus as set forth in claim 6 wherein said curved rear-projection screen is contoured generally in the form of a cylinder.

9. Visual display apparatus as set forth in claim 6 wherein the major axis of said curved rear-projection screen is positioned substantially horizontally.

10. Visual display apparatus as set forth in claim 6 wherein said curved folding mirror is contoured substantially in the form of a cylinder.

11. Visual display apparatus as set forth in claim 6 wherein the major axis of said curved folding mirror is arranged at substantially right angles to that of said curved rear-projection screen.

12. Visual display apparatus as set forth in claim 6 including means to project an anamorphically compensated image for reflection from said curved folding mirror onto said curved rear-projection screen.

13. Visual display apparatus as set forth in claim 12 including means to adjust the magnification of said projected image at least in one direction.

14. Visual display apparatus as set forth in claim 12 including means to collimate the light in said scene projected onto said curved folding mirror.

15. Visual display apparatus as set forth in claim 13 including at least 3 flat folding mirrors to reflect from said curved folding mirror onto said curved rear-projection screen, an image that is desired to be viewed at said viewing position.

16. Visual display apparatus as set forth in claim 10 at least one flat folding mirror to reflect from said cylindrical folding mirror onto said cylindrical rear-projection screen an image desired to be viewed at said viewing position.

17. Visual display apparatus as set forth in claim 13 wherein said means to adjust the magnification includes an anamorphic lens.

* * * * *